(12) United States Patent
Chen et al.

(10) Patent No.: US 11,564,485 B2
(45) Date of Patent: Jan. 31, 2023

(54) ADJUSTABLE KEYBOARD BRACKET MECHANISM

(71) Applicant: CHEN-SOURCE INC., Taoyuan (TW)

(72) Inventors: Yuan-Chen Chen, Taoyuan (TW); Sheng-Wang Liu, Taoyuan (TW)

(73) Assignee: CHEN-SOURCE INC., Taoyuan (TW)

( * ) Notice: Subject to any disclaimer, the term of this patent is extended or adjusted under 35 U.S.C. 154(b) by 207 days.

(21) Appl. No.: 17/143,660

(22) Filed: Jan. 7, 2021

(65) Prior Publication Data

US 2022/0095788 A1 Mar. 31, 2022

(30) Foreign Application Priority Data

Sep. 29, 2020 (TW) .................................. 109212881

(51) Int. Cl.
*A47B 21/03* (2006.01)
*F16M 13/02* (2006.01)

(52) U.S. Cl.
CPC ....... *A47B 21/0314* (2013.01); *F16M 13/022* (2013.01); *A47B 2021/0321* (2013.01); *F16M 2200/022* (2013.01); *F16M 2200/06* (2013.01)

(58) Field of Classification Search
CPC ........ A47B 21/0314; A47B 2021/0321; F16M 13/022; F16M 2200/022; F16M 2200/06
See application file for complete search history.

(56) References Cited

U.S. PATENT DOCUMENTS

| | | | | | |
|---|---|---|---|---|---|
| 5,839,373 A | * | 11/1998 | Lin | ..................... | A47B 21/0314 108/138 |
| 5,881,984 A | * | 3/1999 | Lin | ..................... | A47B 21/0314 108/143 |
| 5,924,666 A | * | 7/1999 | Liu | ..................... | A47B 21/0314 248/278.1 |
| 6,027,090 A | * | 2/2000 | Liu | ..................... | A47B 21/0314 248/278.1 |
| 6,173,934 B1 | * | 1/2001 | Lin | ..................... | A47B 21/0314 108/143 |
| 6,450,467 B2 | * | 9/2002 | Timm | ................ | A47B 21/0314 312/28 |

(Continued)

FOREIGN PATENT DOCUMENTS

WO    WO-0114663 A1 *  3/2001  ......... A47B 21/0314

*Primary Examiner* — Eret C McNichols (74) *Attorney, Agent, or Firm* — Muncy, Geissler, Olds & Lowe, P.C.

(57) ABSTRACT adjustable keyboard bracket mechanism includes fixed seat provided with first axle for use as pivot and rotatable second axle; bracket set including first support with one end thereof fastened to the first axle and the second axle and the other end thereof provided with third axle, second support having one end thereof fastened to the second axle and the other end thereof provided with fourth axle and adjustment device set fastened to the third axle and the fourth axle, the adjustment device set including rotating adjustment block having two opposite sides thereof respectively provided with first friction wheels and two mating friction blocks each having inner side thereof provided with second friction wheel for fitting the first friction wheel to form the positioning or rotating adjustment status of the adjustment device set; and connecting seat assembled on the rotating adjustment block opposite to the third axle and the fourth axle.

8 Claims, 8 Drawing Sheets

(56) References Cited

U.S. PATENT DOCUMENTS

| | | | |
|---|---|---|---|
| 6,565,056 B2* | 5/2003 | Lin .................... | A47B 21/0314 |
| | | | 108/138 |
| 7,188,813 B2* | 3/2007 | Kollar ................ | A47B 21/0314 |
| | | | 248/918 |
| 7,533,859 B2* | 5/2009 | Blackburn ............. | F16M 11/10 |
| | | | 248/286.1 |
| 9,320,352 B2* | 4/2016 | Blackburn ......... | A47B 21/0314 |
| 9,968,186 B2* | 5/2018 | Failing ............... | A47B 21/0314 |
| 2004/0262477 A1* | 12/2004 | Whitaker ........... | A47B 21/0314 |
| | | | 248/918 |
| 2009/0095874 A1* | 4/2009 | Young ............... | F16M 11/2021 |
| | | | 248/583 |
| 2015/0201747 A1* | 7/2015 | Blackburn ......... | A47B 21/0314 |
| | | | 108/5 |
| 2015/0359327 A1* | 12/2015 | Brennan ............ | A47B 21/0314 |
| | | | 108/116 |
| 2021/0393032 A1* | 12/2021 | Chen ................. | F16M 11/2092 |

* cited by examiner

ADJUSTABLE KEYBOARD BRACKET MECHANISM

This application claims the priority benefit of Taiwan patent application number 109212881, filed on Sep. 29, 2020.

BACKGROUND OF THE INVENTION

1. Field of the Invention

The present invention relates to keyboard bracket technology and more particularly, to an adjustable keyboard bracket mechanism, which is so configured that when the connecting seat is turned upward, the gap between the first and third axles and the first and second supports is enlarged to adjust the height of the connecting seat; when the connecting seat is turned downward, the gap between the first and third axles and the first and second supports is reduced to fix the height of the connecting seat.

2. Description of the Related Art

In today's home life and office environment, the use of LCD screens, OLED screens, LCD TVs or plasma TVs, as a cable/wireless TV or as a computer monitor, has become a part of daily life. The stand attached to the aforementioned thin display can be rotated in the left and right directions or adjusted in the front and back directions to meet the user's viewing angle. There is also a fixing method of installing a thin display on a wall through a hanger, but this method does not allow adjustment of the position of the screen and its display angle at any time, and the thin display is more restricted when viewing.

In order to adjust the viewing angle of the monitor screen and reduce the need for the screen to occupy the desktop in office situations, the monitor is installed on a support frame that can be turned and can support the screen in position. The support frame is equipped with a fixing clip, a hanging mount or a wall mount for easy installation on the desktop, rack or wall. The viewing angle and position of the monitor can be adjusted by the multiple swing arms or lifting torque arms set on the support frame. The support frame for the monitor is usually used with a keyboard/mouse holder, and the keyboard/mouse holder is set on the swing arm or the lifting torque arm. Through the position adjustment mechanism of the display, keyboard and mouse, the user can perform related operations of the three in a standing or sitting position. The distance between the monitor support frame and the keyboard/mouse holder is fixed. For non-ordinary figures (taller or shorter), there will be problems in operation.

Even if there is a lifting column product that can adjust the support frame and keyboard/mouse holder recently, the lifting column still needs to use hand tools or screw locks to adjust the height of the monitor and the distance between the support frame and the keyboard/mouse holder, which is more inconvenient.

The aforementioned adjustable support frame structure using hand tools has another disadvantage. When the adjustment mechanism of the lifting column is not adjusted in place or the adjustment screw is not properly tightened, the support frame will be locked too much to be lifted and moved; or the lock is too loose to bear the weight of the display and quickly fall. Therefore, the conventional display support frame has the aforementioned shortcomings, which need to be improved by those engaged in this industry.

SUMMARY OF THE INVENTION

The present invention has been accomplished under the circumstances in view. It is the main object of the present invention to provide an adjustable keyboard bracket mechanism, which comprises a fixed seat, a bracket set and a connecting seat. The fixed seat comprises a first axle provided on a bottom side thereof for use as a pivot, and a second axle rotatably provided on one side relative to the first axle. The bracket set comprises a first support, a second support, and an adjustment device set. The first support has one end thereof fastened to the first axle and the second axle, and an opposite end thereof fixedly provided with a third axle. The second support has one end thereof fastened to the second axle, and an opposite end thereof fixedly provided with a fourth axle. The adjustment device set is fastened to the third axle and the fourth axle, comprising a rotating adjustment block in the middle and two mating friction blocks at two opposite lateral sides relative to the rotating adjustment block. The rotating adjustment block has two opposite side walls thereof respectively provided with a first friction wheel. The two mating friction blocks each have an inner side thereof provided with a second friction wheel corresponding to the first friction wheels for resisting or fitting each other to form a positioning and rotating adjustment status of the adjustment device set. The connecting seat comprises two opposite side panels assembled on the rotating adjustment block opposite to the third axle and the fourth axle. When the connecting seat is turned upward, the gap between the first and third axles and the first and second supports is enlarged to adjust the height of the connecting seat. When the connecting seat is turned downward, the gap between the first and third axles and the first and second supports is reduced to fix the height of the connecting seat.

Preferably, the first support comprises a first axle hole located on a top of the one end thereof for pivoting to the first axle, a third axle hole located on a top of the other end thereof for pivoting to the third axle, a second axle hole located on a bottom of the one end thereof for the sliding of the second axle, and a fourth axle hole located on a bottom of the other end thereof for the insertion of the fourth axle.

Preferably, the rotating adjustment block of the adjustment device set is provided with a through hole for the insertion of the third axle and a through hole for the insertion of the fourth axle. The two mating friction blocks each have a through hole for the insertion of the third axle and a through hole for the insertion of the fourth axle. The through hole on the rotating adjustment block for the insertion of the third axle is oval. The through holes of the rotating adjustment block and the two mating friction blocks provided for the insertion of the fourth axle respectively cut through the center of the first friction wheels and the center of the second friction wheels.

Preferably, the two side panels of said connecting seat each are provided with a mating connection hole corresponding to the third axle hole, and a sliding slot corresponding to the fourth axle holes. The mating connection holes of the side panels of the connecting seat are respectively pivotally coupled to the third axle hole by a respective pivot. The connecting seat further comprises a rod member slidably mounted in the sliding slot on one side panel of the connecting seat, and a lever mounted at one end of the rod member turnable to lock the rod member to the associating sliding slot.

Preferably, the first friction wheel comprises a plurality of equiangularly spaced, sector-shaped first spiral surfaces, a first recessed portion formed on one lateral side of each first spiral surface, a first protrusion formed on an opposite lateral side of each first spiral surface, and a first step wall defined between the first recessed portion at one lateral side of each first spiral surface and the first protrusion at the opposite lateral side of the adjacent first spiral surface.

Preferably, the second friction wheel comprises a plurality of equiangularly spaced, sector-shaped second spiral surfaces, a second recessed portion formed on one lateral side of each second spiral surface, a second protrusion formed on an opposite lateral side of each second spiral surface, and a second step wall defined between the second recessed portion at one lateral side of each second spiral surface and the second protrusion at the opposite lateral side of the adjacent second spiral surface.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Referring to FIGS. 1-6, an elevational view of an adjustable keyboard bracket mechanism, an exploded view of the adjustable keyboard bracket mechanism in accordance with the present invention, another exploded view of the adjustable keyboard bracket mechanism, a detailed structure diagram of the adjustment device set of the adjustable keyboard bracket mechanism, a side view of the adjustable keyboard bracket mechanism and a sectional side view of the adjustable keyboard bracket mechanism are shown. The adjustable keyboard bracket mechanism includes a fixed seat 1, a bracket set 2 and a connecting seat 3.

The bottom side of the fixed seat 1 is provided with a first axle 11 as a pivot, and a second axle 12 that can be rotated is provided on one side of the first axle 11.

The bracket set 2 comprises a first support 21 and a second support 22 that can be assembled on the upper and lower sides. One end of the first support 21 is fastened with the first axle 11 and the second axle 12, and the other end of the first support 21 is fastened with a third axle 23. One end of the second support 22 is fastened with the second axle 12, and the other end of the second support 22 is fastened with a fourth axle 24. An adjustment device set 25 is fastened with the third axle 23 and the fourth axle 24.

The adjustment device set 25 comprises a rotating adjustment block 251 in the middle, and two mating friction blocks 252 at two opposite lateral sides relative to the rotating adjustment block 251. The rotating adjustment block 251 has two opposite side walls thereof respectively provided with a first friction wheel 2511. The two mating friction blocks 252 each have an inner side thereof provided with a second friction wheel 2521 corresponding to the two first friction wheels 2511 for resisting or fitting each other to form the positioning and rotating adjustment status of the adjustment device set 25.

The connecting seat 3 has two opposite lateral sides thereof respectively provided with a side panel 31. The two side panels 31 are assembled on the rotating adjustment block 251 opposite to the third axle 23 and the fourth axle 24.

The first support 21 has a first axle hole 211 located on the top of the one end thereof for pivoting to the first axle 11, a third axle hole 213 located on the top of the other end thereof for pivoting to the third axle 23, a second axle hole 212 located on the bottom of the one end thereof for the sliding of the second axle 12, and a fourth axle hole 214 located on the bottom of the other end thereof for the insertion of the fourth axle 24.

The rotating adjustment block 251 and mating friction blocks 252 of the adjustment device set 25 are respectively provided with a through hole of the insertion of the third axle 23 and the fourth axle 24 respectively. The rotating adjustment block 251 is provided with a through hole 2516 for the insertion of the third axle 23 and a through hole 2517 for the insertion of the fourth axle 24. The two mating friction blocks 252 each have a through hole 2526 for the insertion of the third axle 23 and a through hole 2527 for the insertion of the fourth axle 24. The through hole 2516 on the rotating adjustment block 251 for the insertion of the third axle 23 is oval. The through holes (2517,2527) of the rotating adjustment block 251 and the two mating friction blocks 252 provided for the insertion of the fourth axle 24 respectively cut through the center of the first friction wheels 2511 and the center of the second friction wheels 2521.

Figure 4:
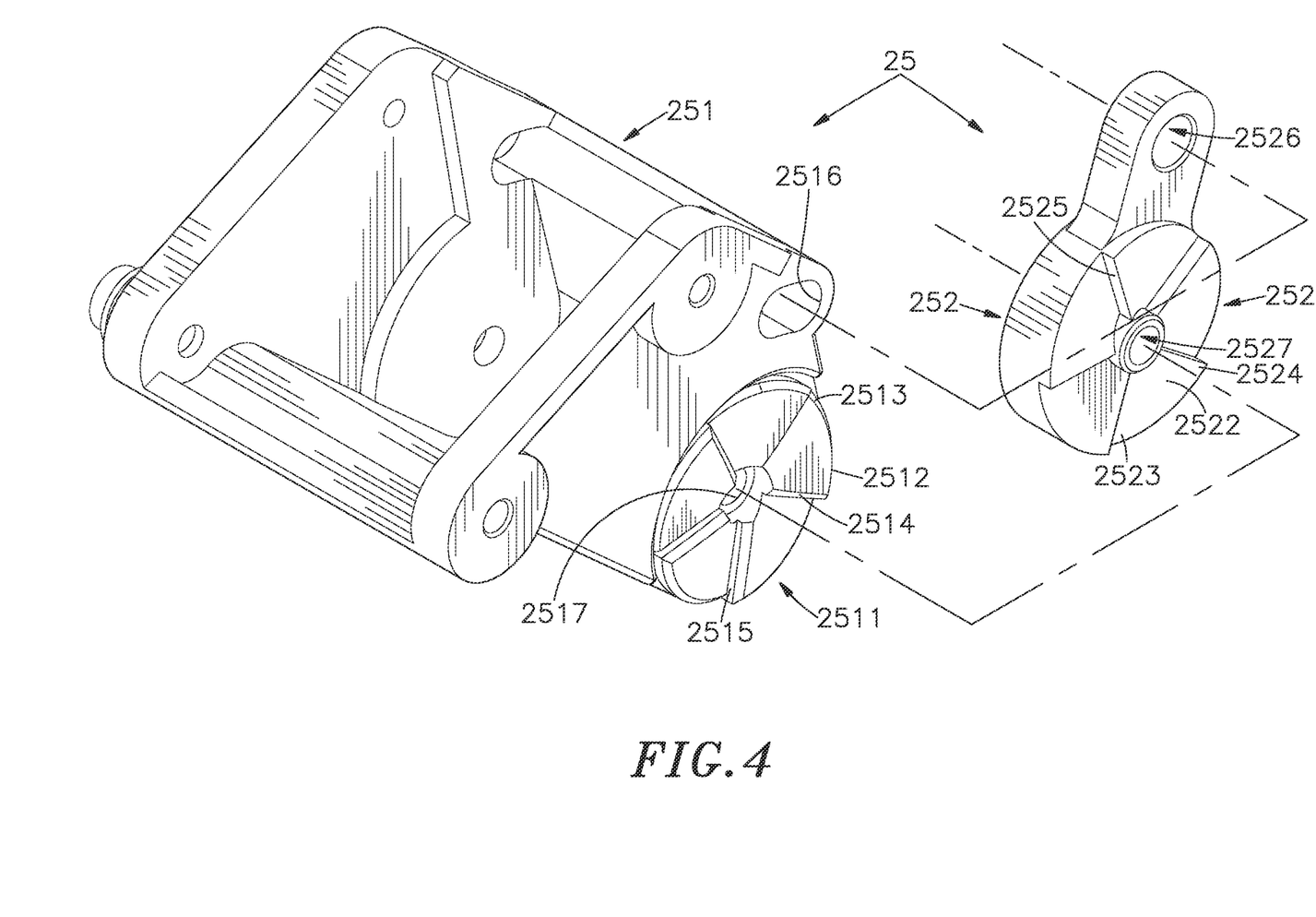
FIG. 4 is a detailed structure diagram of the adjustment device set of the adjustable keyboard bracket mechanism in accordance with the present invention.
Figure 5:
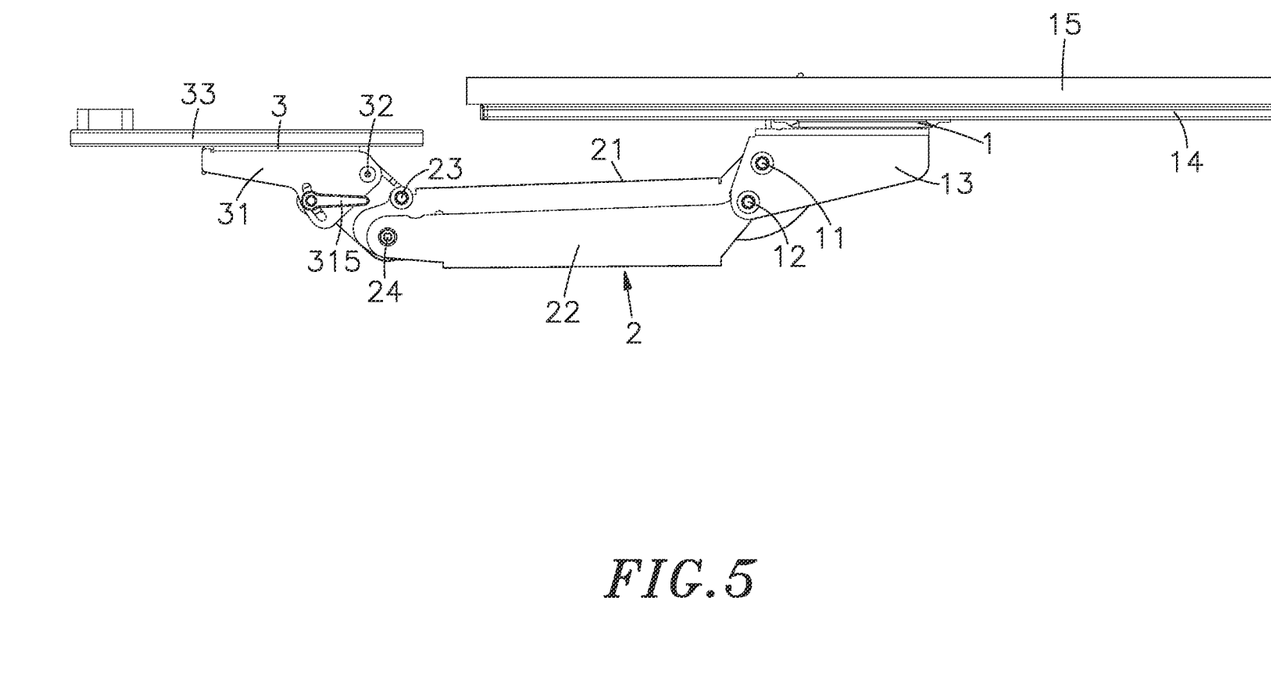
FIG. 5 is a side view of the adjustable keyboard bracket mechanism in accordance with the present invention.
Figure 6:
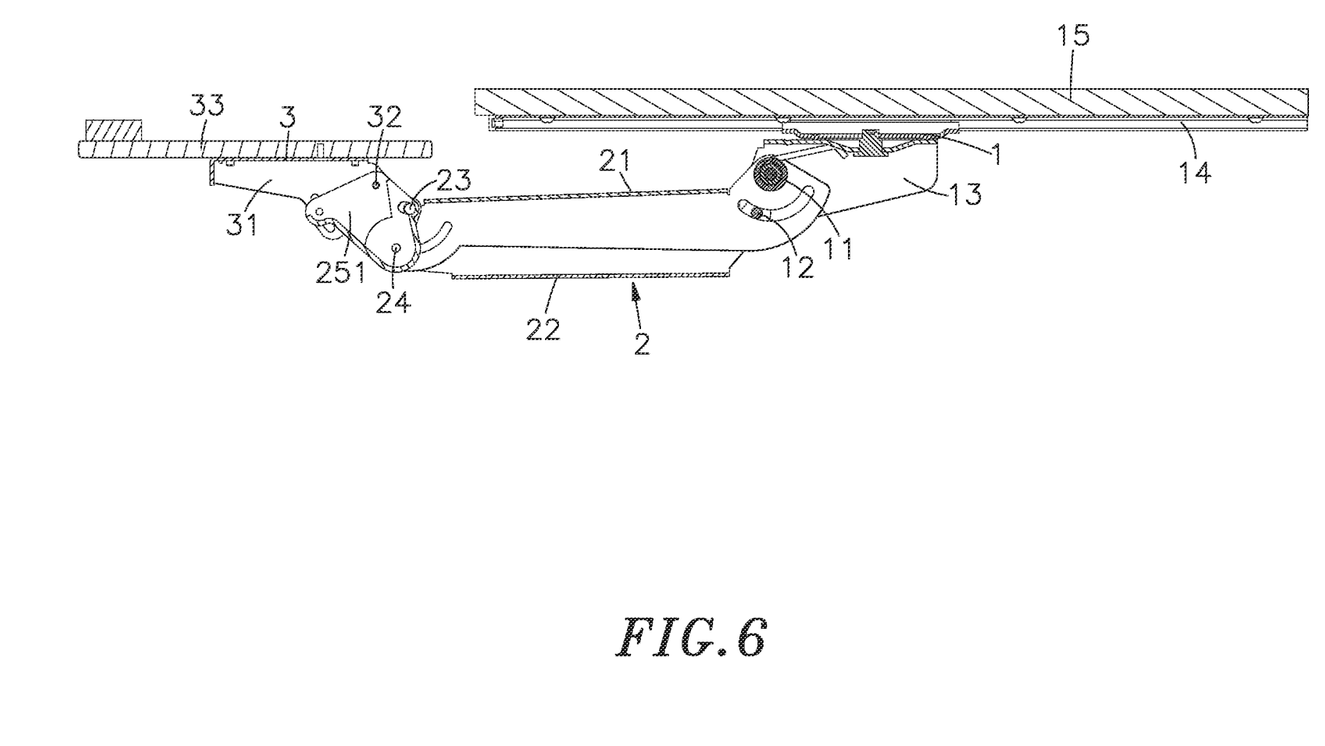
FIG. 6 is a sectional side view of the adjustable keyboard bracket mechanism in accordance with the present invention.

The first friction wheel 2511 has a plurality of equiangularly spaced, sector-shaped first spiral surfaces 2512, a first recessed portion 2513 formed on one lateral side of each first spiral surface 2512, a first protrusion 2514 formed on the other lateral side of each first spiral surface 2512, and a first step wall 2515 defined between the first recessed portion 2513 at one lateral side of each first spiral surface 2512 and the first protrusion 2514 at the other lateral side of the adjacent first spiral surface 2512.

The second friction wheel 2521 has a plurality of equiangularly spaced, sector-shaped second spiral surface 2522, a second recessed portion 2523 formed on one lateral side of each second spiral surface 2522, a second protrusion 2524 formed on the other lateral side of each second spiral surface 2522, and a second step wall 2525 defined between the second recessed portion 2523 at one lateral side of each second spiral surface 2522 and the second protrusion 2524 at the other lateral side of the adjacent second spiral surface 2522.

Figure 2:
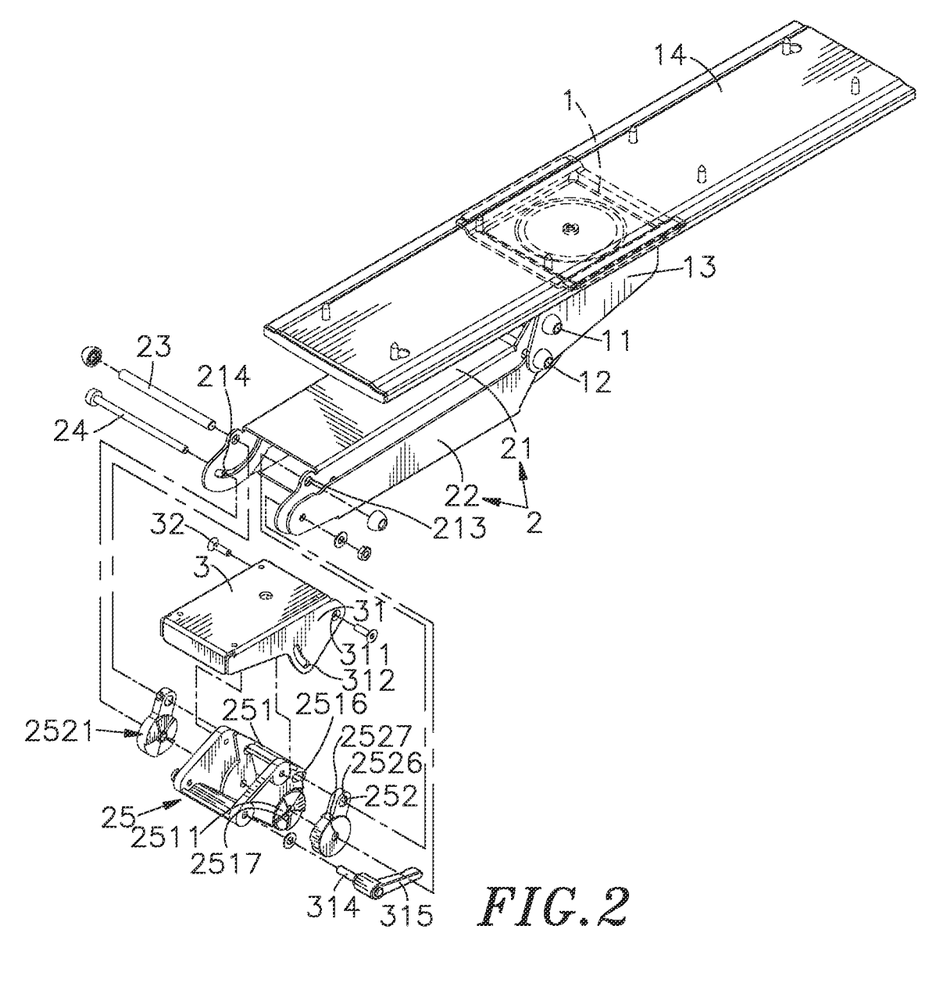
FIG. 2 is an exploded view of the adjustable keyboard bracket mechanism in accordance with the present invention.
Figure 3:
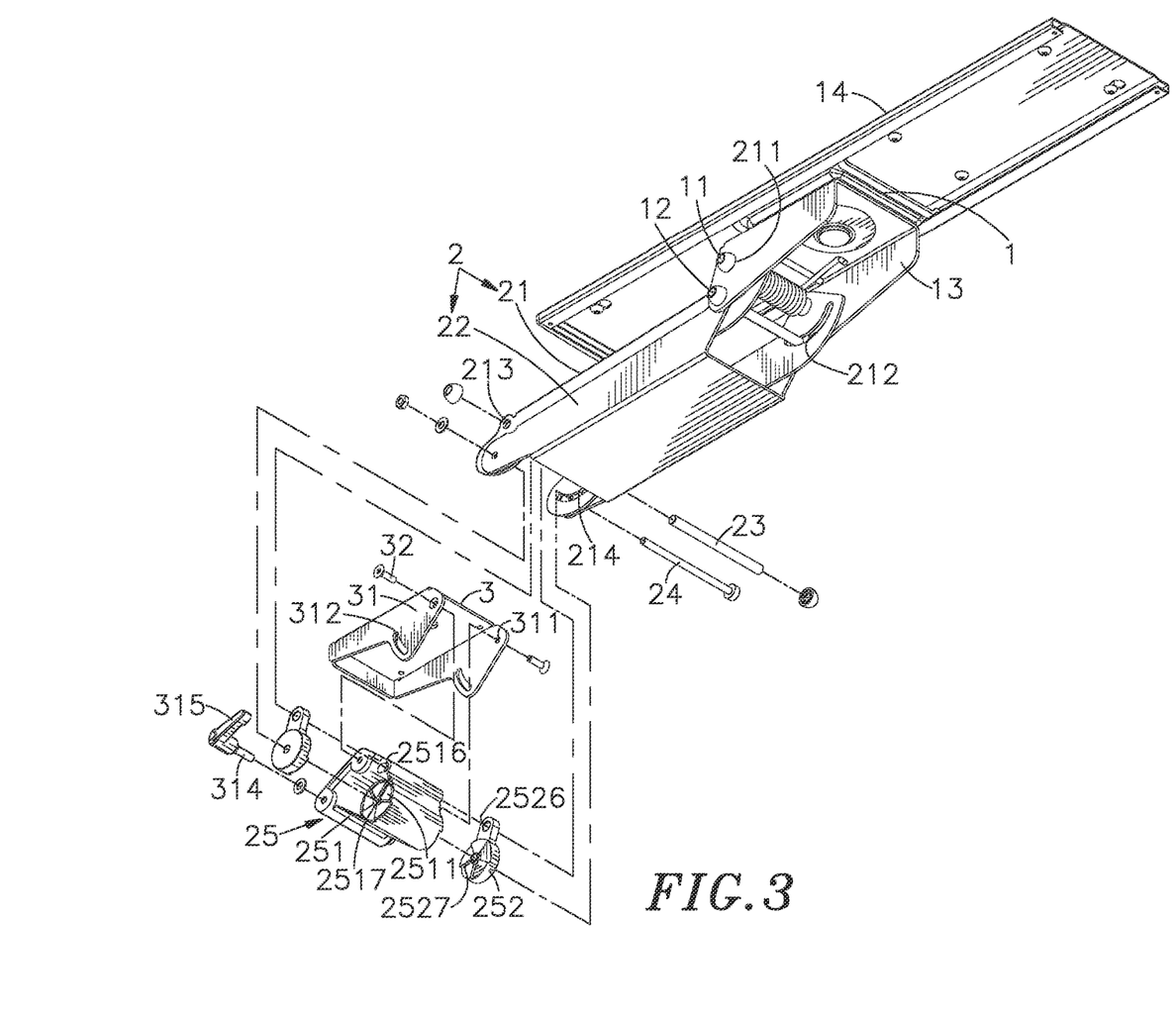
FIG. 3 is another exploded view of the adjustable keyboard bracket mechanism in accordance with the present invention.

The two side panels 31 respectively downwardly extend from two opposite lateral sides of the connecting seat 3, each being provided with a mating connection hole 311 corresponding to the third axle hole 213. The mating connection holes 311 are respectively pivotally coupled to the third axle hole 213 by a respective pivot 32. The two side panels 31 each are further provided with a sliding slot 312 corresponding to the fourth axle holes 214. A rod member 314 is slidably mounted in one sliding slot 312. One end of the rod member 314 is provided with a lever 315 that can be turned to lock the rod member 314 to the sliding slot 312.

Figure 1:
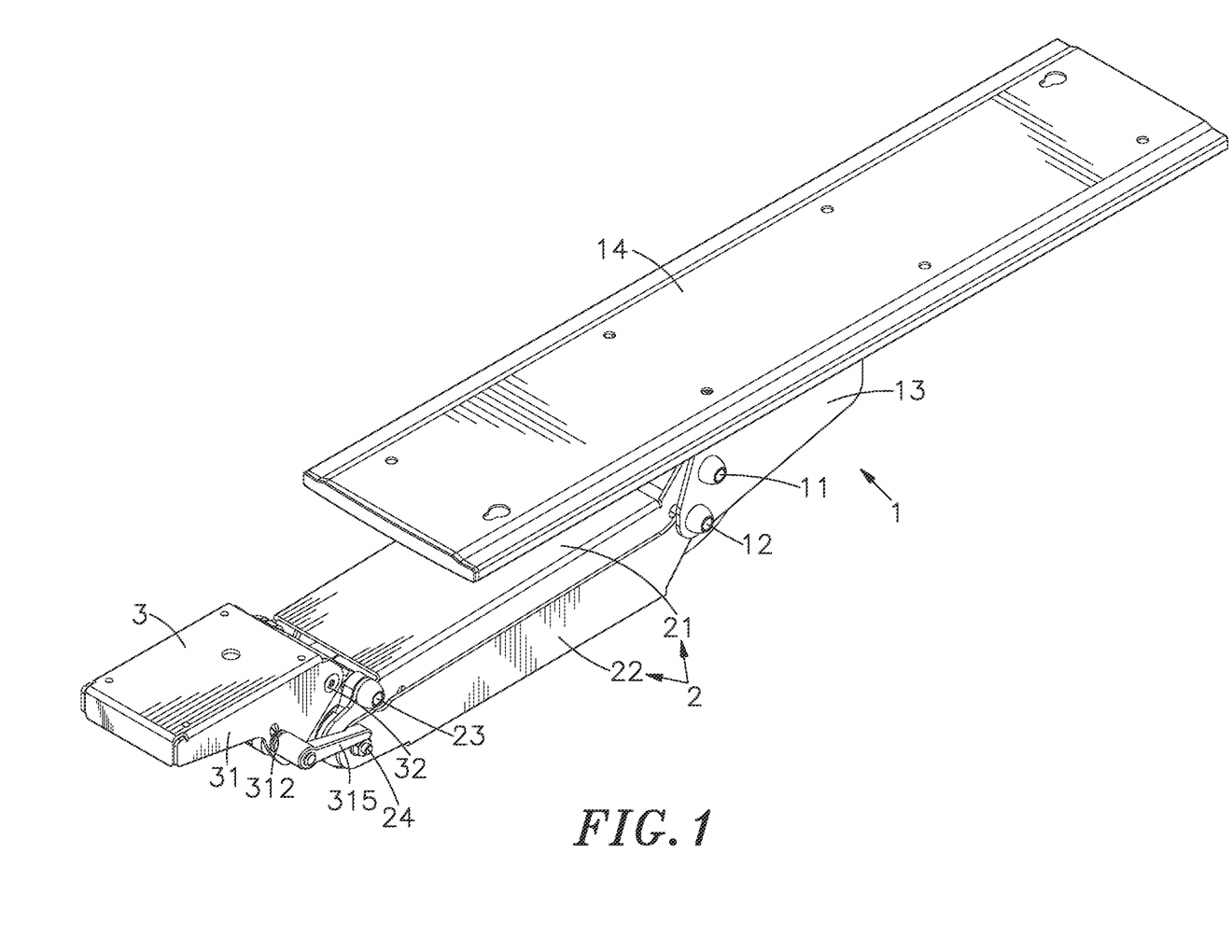
FIG. 1 is an oblique top elevational view of an adjustable keyboard bracket mechanism in accordance with the present invention.

The top of the fixed seat 1 is mounted with a positioning plate 14, and a first tray 15 is assembled on the top of the positioning plate 14 for holding a monitor (not shown). The top of the connecting seat 3 is mounted with a second tray 33 for holding a keyboard (not shown) and a mouse (not shown).

When assembling the adjustable keyboard bracket mechanism of the present invention, the first support 21 and second support 22 of the bracket set 2 are combined with each other in the upper and lower directions.

After the axle holes of the first support 21 and the axle holes of the second support 22 are respectively aligned, one end of the assembled first support 21 and second support 22 is inserted in between the two side panels 13 of the fixed seat 1, and then the first axle 11 and the second axle 12 are installed to fasten the fixed seat 1, the first support 21 and the second support 22 together, thereby forming a positioning structure. Then, the rotating adjustment block 251 and the two mating friction blocks 252 are aligned and placed between the two side panels 31 of the connecting seat 3, and then the two pivots 32, the rod member 314 and the lever 315 are installed, so that the rotating adjustment block 251, the mating friction blocks 252 and the connecting seat 3 are assembled. Thereafter, the rotating adjustment block 251 and the mating friction blocks 252 that have been assembled with the connecting seat 3 is placed in the other end of the assembled first support 21 and second support 22 to keep the through holes (2516,2517,2526,2527) in alignment with the third axle hole 213 and the fourth axle hole 214 for the mounting of the third axle 23 and the fourth axle 24. After installation of the third axle 23 and the fourth axle 24, the positioning plate 14 and the first tray 15 are properly mounted on the top of the fixed seat 1, and then the second tray 33 is mounted on the top of the connecting seat 3 to complete the installation of the adjustable keyboard bracket mechanism. At this time, the first support 21, the second support 22, the first axle 11, the second axle 12, the third axle 23 and the fourth axle 24 constitute a four-bar linkage for adjusting the height of the second tray 33.

Figure 7:
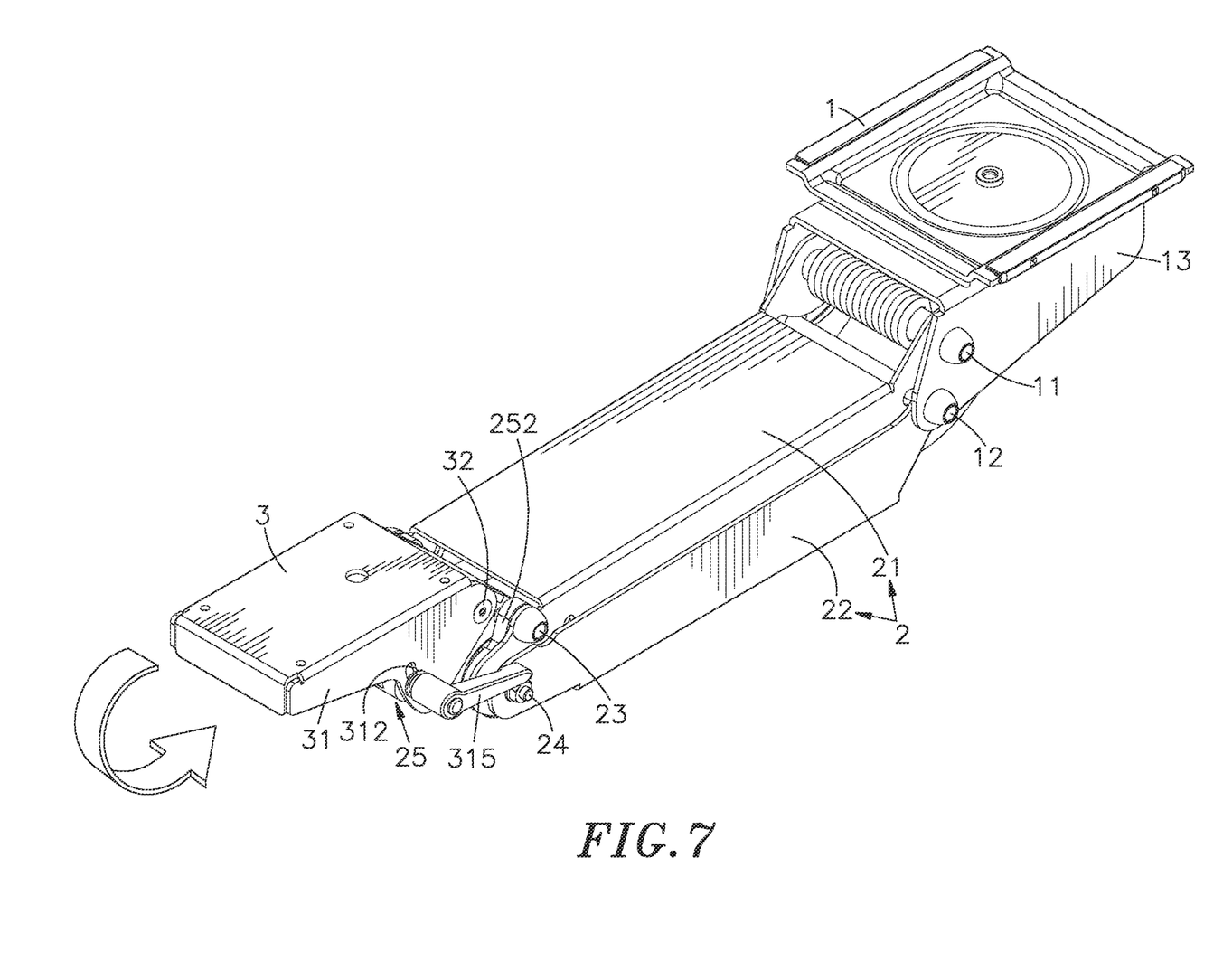
FIG. 7 is a schematic drawing illustrating an adjustment operation of the adjustable keyboard bracket mechanism in accordance with the present invention.
Figure 8:
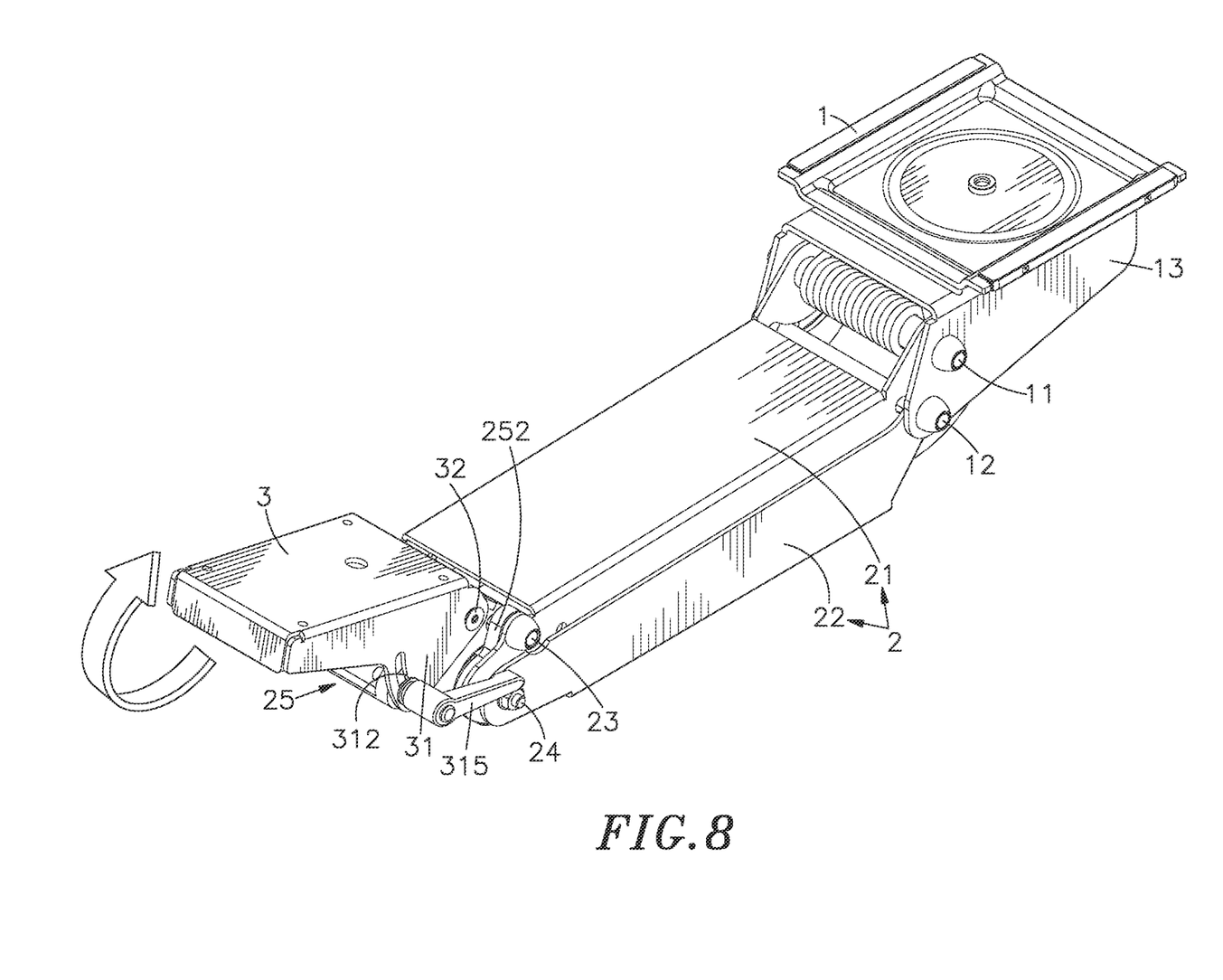
FIG. 8 is a schematic drawing illustrating another adjustment operation of the adjustable keyboard bracket mechanism in accordance with the present invention.

Referring to FIGS. 7 and 8, adjustment operations of the adjustable keyboard bracket mechanism provided by the present invention are outlined hereinafter. When turning the second tray 33 upward to adjust the height of the connecting seat 3 and the second tray 33, the adjustment device set 25 located at the bottom of the connecting seat 3 is activated, and the first protrusions 2514 of the first friction wheels 2511 of the rotating adjustment block 251 are respectively abutted against the second protrusions 2524 of the second friction wheels 2521 of the mating friction blocks 252 (at this time, the distance between the first friction wheels 2511 and the second friction wheels 2521 is the largest) and rotated. When the first protrusions 2514 are moved along the respective second spiral surfaces 2522 to fit the respective second recessed portions 2523 (relatively, the second protrusions 2524 are moved along the respective first spiral surfaces 2512 to fit the respective first recessed portions 2513) and the first step walls 2515 and the second step walls 2525 contact to produce lateral resistance, the distance between the first friction wheels 2511 and the second friction wheels 2521 becomes the shortest. At the same time, there is a large gap between first axle 11, third axle 23 and first support 21, second support 22. Using the second axle 12, the fourth axle 24 and the matching axle holes as the rotation space, you can freely pull the connection structure of the second tray 33, the connecting seat 3, the first support 21, the second support 22, and the four axles (11,12,23,24) for high and low position adjustment. When the user has adjusted the second tray 33 to the preset height, the user only needs to pull it down. At this time, the first protrusions 2514 are moved away from the respective second recessed portions 2523 along the respective second spiral surfaces 2522 into abutment against the respective second protrusions 2524 (relatively, the second protrusions 2524 are moved away from the respective first recessed portions 2513 along the respective first spiral surfaces 2512 into abutment against the respective first protrusions 2514). At this time, the distance between the first friction wheels 2511 and the second friction wheels 2521 becomes the largest. At the same time, the first axle 11, the third axle 23, the first support 21 and the second support 22 are positionally locked, and the adjustment operation of the adjustable keyboard bracket mechanism of the present invention is completed.

As shown in FIGS. 1-8, the present invention provides an adjustable keyboard bracket mechanism, which comprises a fixed seat, a bracket set and a connecting seat. The fixed seat comprises a first axle provided on a bottom side thereof for use as a pivot, and a second axle rotatably provided on one side relative to the first axle. The bracket set comprises a first support, a second support, and an adjustment device set. The first support has one end thereof fastened to the first axle and the second axle, and an opposite end thereof fixedly provided with a third axle. The second support has one end thereof fastened to the second axle, and an opposite end thereof fixedly provided with a fourth axle. The adjustment device set is fastened to the third axle and the fourth axle, comprising a rotating adjustment block in the middle and two mating friction blocks at two opposite lateral sides relative to the rotating adjustment block. The rotating adjustment block has two opposite side walls thereof respectively provided with a first friction wheel. The two mating friction blocks each have an inner side thereof provided with a second friction wheel corresponding to the first friction wheels for resisting or fitting each other to form a positioning and rotating adjustment status of the adjustment device set. The connecting seat comprises two opposite side panels assembled on the rotating adjustment block opposite to the third axle and the fourth axle. When the connecting seat is turned upward, the gap between the first and third axles and the first and second supports is enlarged to adjust the height of the connecting seat. When the connecting seat is turned downward, the gap between the first and third axles and the first and second supports is reduced to fix the height of the connecting seat. The adjustable keyboard bracket mechanism has the advantages of easy adjustment and stable positioning. For the relative positioning and height adjustment between the monitor and the keyboard/mouse, the adjustable keyboard bracket mechanism has excellent practicality.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An adjustable keyboard bracket mechanism, comprising:
   a fixed seat comprising a first axle provided on a bottom side thereof for use as a pivot and a second axle rotatably provided on one side relative to said first axle;
   a bracket set comprising a first support, a second support and an adjustment device set, said first support having one end thereof fastened to said first axle and said second axle and an opposite end thereof fixedly provided with a third axle, said second support having one end thereof fastened to said second axle and an opposite end thereof fixedly provided with a fourth axle, said adjustment device set being fastened to said third axle and said fourth axle, said adjustment device set comprising a rotating adjustment block in the middle and two mating friction blocks at two opposite lateral sides relative to said rotating adjustment block, said rotating adjustment block having two opposite side walls thereof respectively provided with a first friction wheel, said two mating friction blocks each having an inner side thereof provided with a second friction wheel corresponding to said first friction wheels for resisting or fitting each other to form a positioning and rotating adjustment status of said adjustment device set; and
   a connecting seat comprising two opposite side panels assembled on said rotating adjustment block opposite to said third axle and said fourth axle.

2. The adjustable keyboard bracket mechanism as claimed in claim 1, wherein said first support comprises a first axle hole located on a top of the one end thereof for pivoting to said first axle, a third axle hole located on a top of the other end thereof for pivoting to said third axle, a second axle hole located on a bottom of the one end thereof for the sliding of said second axle, and a fourth axle hole located on a bottom of the other end thereof for the insertion of said fourth axle.

3. The adjustable keyboard bracket mechanism as claimed in claim 1, wherein said rotating adjustment block of said adjustment device set is provided with a through hole for the insertion of said third axle and a through hole for the insertion of said fourth axle; said two mating friction blocks each have a through hole for the insertion of said third axle and a through hole for the insertion of said fourth axle; the said through hole on said rotating adjustment block for the insertion of said third axle is oval; the said through holes of said rotating adjustment block and said two mating friction blocks provided for the insertion of said fourth axle respectively cut through the center of said first friction wheels and the center of said second friction wheels.

4. The adjustable keyboard bracket mechanism as claimed in claim 2, wherein said two side panels of said connecting seat each are provided with a mating connection hole corresponding to said third axle hole and a sliding slot corresponding to said fourth axle holes, and said mating connection holes of said side panels of said connecting seat are respectively pivotally coupled to said third axle hole by a respective pivot; said connecting seat further comprises a rod member slidably mounted in one said sliding slot, and a lever mounted at one end of said rod member turnable to lock said rod member to the associating said sliding slot.

5. The adjustable keyboard bracket mechanism as claimed in claim 1, wherein said fixed seat comprises a positioning plate mounted on a top surface thereof, and a first tray assembled on a top surface of said positioning plate for holding a monitor.

6. The adjustable keyboard bracket mechanism as claimed in claim 1, wherein said connecting seat comprises a second tray mounted on a top surface thereof for holding a keyboard and a mouse.

7. The adjustable keyboard bracket mechanism as claimed in claim 1, wherein said first friction wheel comprises a plurality of equiangularly spaced, sector-shaped first spiral surfaces, a first recessed portion formed on one lateral side of each said first spiral surface, a first protrusion formed on an opposite lateral side of each said first spiral surface, and a first step wall defined between the said first recessed portion at one lateral side of each said first spiral surface and the said first protrusion at the opposite lateral side of the adjacent said first spiral surface.

8. The adjustable keyboard bracket mechanism as claimed in claim 1, wherein said second friction wheel comprises a plurality of equiangularly spaced, sector-shaped second spiral surfaces, a second recessed portion formed on one lateral side of each said second spiral surface, a second protrusion formed on an opposite lateral side of each said second spiral surface, and a second step wall defined between the said second recessed portion at one lateral side of each said second spiral surface and the said second protrusion at the opposite lateral side of the adjacent said second spiral surface.

* * * * *